United States Patent
Jeong et al.

(10) Patent No.: US 9,880,642 B2
(45) Date of Patent: Jan. 30, 2018

(54) MOUSE FUNCTION PROVISION METHOD AND TERMINAL IMPLEMENTING THE SAME

(71) Applicant: Samsung Electronics Co., Ltd, Gyeonggi-do (KR)

(72) Inventors: Changjin Jeong, Seoul (KR); Taewon Kwak, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 173 days.

(21) Appl. No.: 14/146,639

(22) Filed: Jan. 2, 2014

(65) Prior Publication Data

US 2014/0184510 A1    Jul. 3, 2014

(30) Foreign Application Priority Data

Jan. 2, 2013 (KR) .......................... 10-2013-0000324

(51) Int. Cl.
   *G06F 3/0354* (2013.01)
   *G06F 3/041* (2006.01)
   *G06F 3/0488* (2013.01)

(52) U.S. Cl.
   CPC .......... *G06F 3/03543* (2013.01); *G06F 3/041* (2013.01); *G06F 3/0488* (2013.01)

(58) Field of Classification Search
   CPC ...... G06F 3/0343; G06F 3/0488; G06F 3/041; G06F 3/03543
   See application file for complete search history.

(56) References Cited

U.S. PATENT DOCUMENTS

| 2009/0073136 A1 | 3/2009 | Choi |
| 2011/0025633 A1 | 2/2011 | Janik |
| 2011/0080341 A1* | 4/2011 | Helmes ............... G06F 3/03543 345/163 |

(Continued)

FOREIGN PATENT DOCUMENTS

| CN | 102262465 A | 11/2011 |
| CN | 102687101 A | 9/2012 |

(Continued)

OTHER PUBLICATIONS http://www.remotemouse.net/; "Remote Mouse v1.50", Mar. 9, 2012, 5 pages.

(Continued)

*Primary Examiner* — Andrew Sasinowski

(57) ABSTRACT

A touch panel-equipped mobile terminal is configured to be used as a mouse according to a mouse function provision method. The mouse function provision method includes displaying a mouse operation image on a screen of the display unit in response to a mouse host application execution request; detecting a touch gesture made with a touch input tool on the mouse operation image; determining, when movement of the touch input tool is detected, whether a touch hold time counted from the detection of the touch gesture is greater than a first hold threshold; and transmitting, when the touch hold time is greater than the first hold threshold, an object move command to an output terminal and, when the touch hold time is not greater than the first hold threshold, a pointer move command.

16 Claims, 22 Drawing Sheets

(56) References Cited

U.S. PATENT DOCUMENTS

| | | | |
|---|---|---|---|
| 2011/0227947 A1* | 9/2011 | Benko | G06F 3/03543 |
| | | | 345/650 |
| 2011/0231796 A1 | 9/2011 | Vigil | |
| 2011/0248948 A1* | 10/2011 | Griffin | G06F 3/041 |
| | | | 345/174 |
| 2011/0291930 A1 | 12/2011 | Wang | |
| 2012/0032979 A1* | 2/2012 | Blow | G06F 1/1626 |
| | | | 345/647 |
| 2012/0050192 A1 | 3/2012 | Kobayashi | |
| 2012/0092253 A1* | 4/2012 | Irani | G06F 1/1692 |
| | | | 345/157 |
| 2012/0127074 A1 | 5/2012 | Nakamura et al. | |
| 2012/0139847 A1 | 6/2012 | Hunt | |
| 2012/0147049 A1 | 6/2012 | Lee | |
| 2012/0212420 A1 | 8/2012 | Shin | |
| 2012/0235938 A1* | 9/2012 | Laubach | G06F 3/0416 |
| | | | 345/173 |
| 2012/0249475 A1* | 10/2012 | Murphy | G06F 1/1694 |
| | | | 345/174 |
| 2012/0317515 A1* | 12/2012 | Wang | G06F 1/1626 |
| | | | 715/841 |
| 2014/0015786 A1 | 1/2014 | Honda | |
| 2015/0077395 A1 | 3/2015 | Ikeda et al. | |

FOREIGN PATENT DOCUMENTS

| | | |
|---|---|---|
| CN | 102792253 A | 11/2012 |
| JP | 2004-185258 A | 7/2004 |
| JP | 2012-48325 A | 3/2012 |
| JP | 2012-093940 A | 5/2012 |
| WO | 2011-158475 A1 | 12/2011 |
| WO | 2012133576 A1 | 10/2012 |

OTHER PUBLICATIONS

Japanese Patent Office, "Notification of Reasons for Refusal," Japanese Patent Application 2013-268825, Oct. 24, 2016, 8 pages, publisher JPO, Tokyo, Japan.
ISA/KR, "International Search Report," Application No. PCT/KR2013/012210, dated Apr. 9, 2014, 3 pages.
European Patent Office, "European Search Report," Application No. EP 13 19 9665, 8 pages.
State Intellectual Property Office of P.R. China First Office Action, dated Nov. 3, 2017, regarding Chinese Patent Application No. 201410001485.6, 52 pages.

* cited by examiner

MOUSE FUNCTION PROVISION METHOD AND TERMINAL IMPLEMENTING THE SAME

CROSS-REFERENCE TO RELATED APPLICATION(S) AND CLAIM OF PRIORITY

The present application is related to and claims the benefit under 35 U.S.C. § 119(a) of a Korean patent application filed on Jan. 2, 2013 in the Korean Intellectual Property Office and assigned Serial No. 10-2013-0000324, the entire disclosure of which is hereby incorporated by reference.

TECHNICAL FIELD

The present disclosure relates to a mouse function provision method and terminal implementing the same and, in particular, to a touch panel-equipped mobile terminal and a method for using the terminal as a mouse.

BACKGROUND

It is a recent tendency for mobile terminals to adopt a touch panel, and touch panel-based mouse function provision methods are being proposed. The touch panel-equipped mobile terminal (e.g., smartphone) may be used as an input terminal for mouse functions in connection with another terminal (e.g., a TV, PC, or projector) as an output terminal. Although it implements the functionalities of the left and right buttons and wheel of a mouse, the conventional touch panel-based mouse function provision method has a drawback of lack of intuitiveness, resulting in user inconvenience. For example, in order to make a pan or scroll input to the mobile terminal, the user has to make a pan or scroll gesture with a touch tool (e.g., index finger) in a state of pressing a hard key or a soft key presented on the screen with another touch tool (e.g., pen or thumb) inconveniently.

SUMMARY

To address the above-discussed deficiencies of the prior art, it is a primary object to provide a mouse function provision method and mobile terminal implementing the same that is capable of allowing the user to use a touch panel-equipped mobile terminal intuitively and conveniently.

In accordance with an aspect of the present disclosure, a mouse function provision method of a terminal having a display unit equipped with a touch panel includes displaying a mouse operation image on a screen of the display unit in response to a mouse host application execution request; detecting a touch gesture made with a touch input tool on the mouse operation image; determining, when movement of the touch input tool is detected, whether a touch hold time counted from the detection of the touch gesture is greater than a first hold threshold; and transmitting, when the touch hold time is greater than the first hold threshold, an object move command to an output terminal and, when the touch hold time is not greater than the first hold threshold, a pointer move command.

In accordance with another aspect of the present disclosure, a mouse function provision method of a terminal includes displaying an object and a pointer on the object; receiving first touch coordinate and second touch coordinate from a mobile terminal having a touch panel at an interval; determining whether a touch input tool has moved, based on displacement between the first and second touch coordinate; determining, when the touch input tool has moved, whether a touch hold time counted from a time when the first touch coordinate have been received is greater than a first hold threshold; displaying, when the touch hold time is greater than the first hold threshold, the object and the pointer moved at a position corresponding to the second touch coordinate and, when the touch hold time is not greater than the first hold threshold, the pointer moved at a position corresponding to the second touch coordinate.

In accordance with another aspect of the present disclosure, a mobile terminal includes a display unit having a touch panel; a communication unit which communicates with an output terminal displaying an object and a pointer; and a control unit which displaying a mouse operation image on a screen of the display unit in response to a mouse host application execution request; detecting a touch gesture made with a touch input tool on the mouse operation image; determining, when movement of the touch input tool is detected, whether a touch hold time counted from the detection of the touch gesture is greater than a first hold threshold; and transmitting, when the touch hold time is greater than the first hold threshold, an object move command to an output terminal and, when the touch hold time is not greater than the first hold threshold, a pointer move command.

In accordance with still another aspect of the present disclosure, a terminal includes a display unit which displays an object and a pointer on the image; a communication unit which receives first touch coordinate and second touch coordinate from a mobile terminal at an interval; a control unit which controls displaying an object and a pointer on the object, receiving first touch coordinate and second touch coordinate from a mobile terminal having a touch panel at an interval, determining whether a touch input tool has moved, based on displacement between the first and second touch coordinate, determining, when the touch input tool has moved, whether a touch hold time counted from a time when the first touch coordinate have been received is greater than a first hold threshold, displaying, when the touch hold time is greater than the first hold threshold, the object and the pointer moved at a position corresponding to the second touch coordinate and, when the touch hold time is not greater than the first hold threshold, the pointer moved at a position corresponding to the second touch coordinate.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
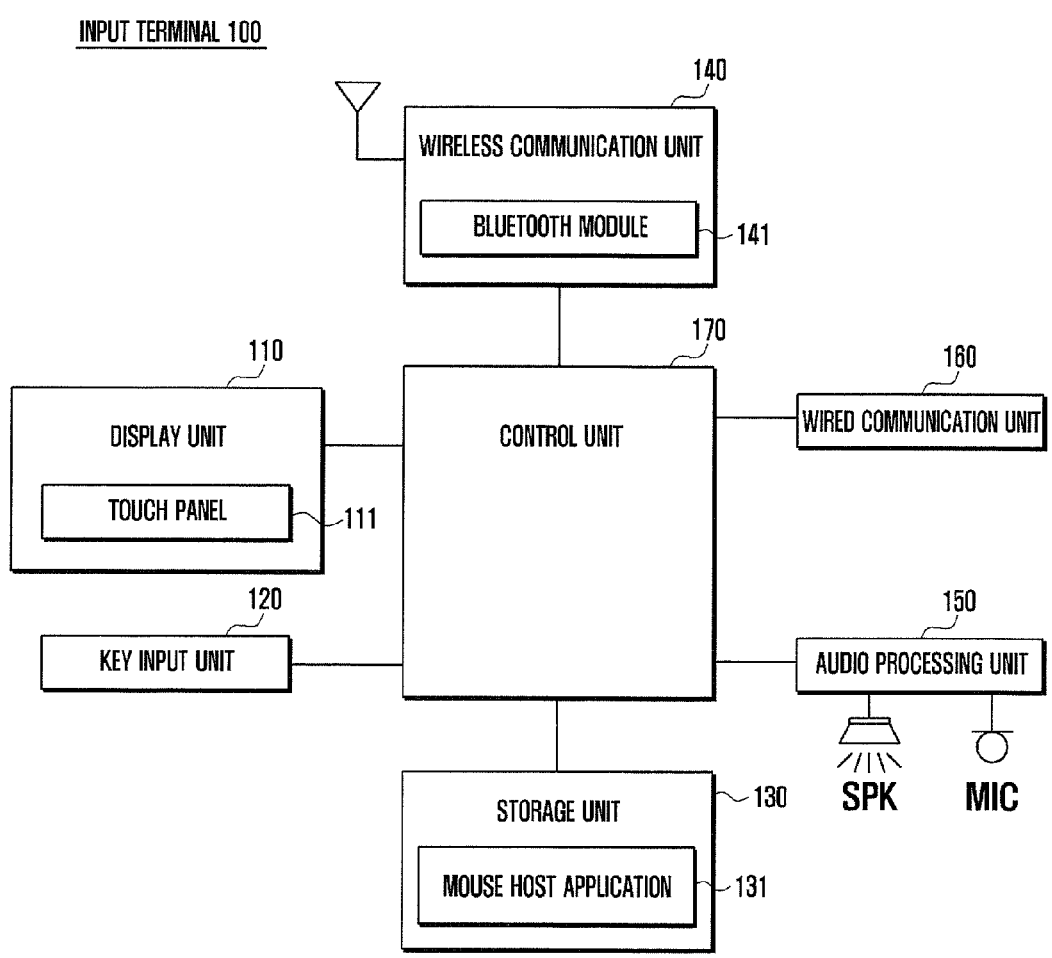
FIG. 1 is a block diagram illustrating a configuration of the input terminal according to an embodiment of the present disclosure.

FIGS. 1 through 16B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The terms and words used in the following description and claims are not limited to the bibliographical meanings, but are merely used by the inventor to enable a clear and consistent understanding of the disclosure. Accordingly, it should be apparent to those skilled in the art that the following description of embodiments of the present disclosure are provided for illustration purpose only and not for the purpose of limiting the disclosure as defined by the appended claims and their equivalents. In the drawings, certain elements may be exaggerated or omitted or schematically depicted for clarity of the disclosure, and the actual sizes of the elements are not reflected. Thus, the present disclosure is not limited by a relative size or distance in the attached drawings.

In the following description, the input terminal is a mobile terminal, such as a smartphone or tablet PC, equipped with a touch panel and capable of communicating with an output terminal. In the following description, the output terminal can be a device capable of receiving input information generated by the terminal and executing a function corresponding to the input information, such as a tablet PC, desktop PC, multimedia device (e.g., home theatre, speaker, MP3, or camcorder), TV, projector, PC connected to a projector, or electronic appliance having a display (e.g., refrigerator or laundry machine).

FIG. 1 is a block diagram illustrating a configuration of the input terminal according to an embodiment of the present disclosure.

Referring to FIG. 1, the input terminal according to an embodiment of the present disclosure includes a display unit 110, a key input unit 120, a storage unit 130, a radio communication unit 140, an audio processing unit 150, a speaker (SPK), a microphone (MIC), and a control unit 170.

The display unit 110 displays at least one object on the screen under the control of the control unit 170. The object is displayed on the display unit 110. The object may include at least one of an image, a text and an icon. That is, if the control unit 170 processes the data to generate the image to be displayed on the screen (e.g. decoding the data) and buffers the image in a buffer, and the display unit 110 converts the buffered image to an analog signal so as to be displayed on the screen. When the terminal powers on, the display unit 110 displays a lock image on the screen. If unlock information (e.g., a password) is input when the lock image is displayed on the screen, the control unit 170 unlocks the screen. That is, the display unit 110 displays an image other than the lock image under the control of the control unit 170. Here, the unlock information may be input in the form of a text (e.g., 1234) entered by means of the keypad displayed on the screen or a key input unit 120 of the input terminal 100, a touch pattern, a touch direction, or a touch gesture made on the display unit 110, or a speech input through the microphone.

The other image may be any of a home image, application execution image, keypad, and menu. The home image includes a background image and icons arranged thereon. The icons represent a corresponding application and contents (e.g., a photo file, video file, recording file, document, and message). If the user selects one of the icons (e.g., by tapping the icon representing a mouse host application 131), the control unit 170 executes the corresponding application (mouse host application 131) and controls the display unit 110 to display the execution screen. The display unit 110 displays a predetermined background image (e.g., a photo preset by the user, default image, and an image downloaded from outside) on a bottom layer under the control of the control unit. The display unit 110 displays at least one other image on the background image under the control of the control unit 170. The display unit 110 may display a first image on a first region and a second image on a second region under the control of the control unit 170. The display unit 110 may be implemented with one of a Liquid Crystal Display (LCD), Organic Light Emitted Diode (OLED), Active Matrix Organic Light Emitted Diode (AMOLED), and flexible display.

The touch panel 111 is mounted on the surface of the display panel of the display unit 110. In detail, the touch panel 111 can be placed on the surface of the display panel of the display unit 100 in an add-on type or inserted into the display unit 110 in an on-cell or in-cell type.

The touch panel 111 generates an analog input signal (e.g., a touch event) in response to the user's gesture made on the touch panel 111, and performs Analog/Digital (A/D) conversion on the analog signal to generate a digital signal to the control unit 170. Here, the input signal includes the touch coordinates (x, y). For example, the controller of the touch panel 111 determines representative coordinates among plural touch coordinates and transfers the representative touch coordinates to the control unit 170. This control operation may be performed by the control unit 170. If the touch coordinates are received from the touch panel 111, the control unit 170 determines that a touch gesture has been made on the touch panel 111 with a touch input tool (e.g., a finger or pen) and, if the touch coordinates are no longer received, the touch of the touch input tool has been released. If the coordinates are changed, e.g., from (x0, y0) to (x1, y1), and the displacement (e.g., $D(D^2=(x0-x1)^2+(y0-y1)^2)$ is greater than a movement threshold (e.g., 1 millimeter), the control unit 170 determines that the touch input tool has moved. If the movement of the touch input tool is detected, the control unit 170 calculates the touch displacement (dx, dy) and movement speed of the touch input tool.

The control unit 170 can differentiate among a user's touch gestures, such as a single touch, multi-touch, tap, double tap, long tap, tap & touch, drag, flick, press, pinch in, and pinch out, based on the touch coordinates, touch release, tough movement, touch displacement, touch speed, and the like. The single touch denotes the gesture of contacting a point of the touch panel 111 by means of a touch input tool; the multi-touch denotes the gesture of contacting multiple points of the touch panel 111 by means of a touch input tool, e.g., thumb and index finger; and the tap denotes the gesture in which the touch input tool contacts and then releases immediately at a point without movement. The double tap denotes of the gesture of making the tap twice at a point, the long tap denotes the gesture of maintaining the tap over a predetermined time duration without movement, and the tap & touch denotes the gesture of making a tap at a point on the screen and a touch subsequently within a predetermined time (e.g., 0.5 second). The drag denotes the gesture of making a contact at a point on the screen by means of a touch input tool and moving the touch input tool without releasing the contact, the flick denotes the gesture of moving the touch input tool faster than the drag gesture and the releasing the contact of the touch input tool, the press denotes the gesture of making a touch and pressing at a point, the pinch-in is the gesture of making the contact at two points and narrowing the distance between the two contact points, and the pinch-out is the gesture of making the contact at two points and widening the distance between the two contact points. That is, the touch means the state where a touch input tool contacts the touch panel 111 and other gestures denote changes in touch state.

The touch panel 111 can be an integrated touch panel including a hand touch panel for detecting a hand gesture and a pen touch panel for detecting a pen gesture. Here, the hand touch panel is implemented as a capacitive type. Of course, the hand touch panel can be implemented as a resistive type, infrared type, or microwave type. The hand touch panel is capable of detecting a touch event made using an object (e.g., a conductive material object capable of influencing the electric capacitance) as well as a touch event made by a hand gesture of the user. The pen touch panel can be implemented as an electromagnetic induction type. In this case, the pen touch panel detects the touch event made using a stylus pen manufactured to form a magnetic field.

The key input unit 120 includes a plurality of alphanumeric keys for inputting alphanumeric information and function keys for configuring and setting various functions. These keys may include a menu key, a screen on/off key, a power on/off key, a volume control key, and the like. The key input unit 120 is capable of generating a key event signal related to the user setting and function control of the input terminal 100 to the control unit 170. The key event is capable of a power on/off event, a volume control event, a screen on/off event, a shutter event, and the like. The control unit 170 is capable of controlling the components in response to the key event. The keys of the key input unit 120 are referred to as hard keys while the virtual keys displayed by the display unit 110 are referred to as soft keys.

The storage unit 130 may be implemented with at least one of a disk, Random Access Memory (RAM), Read Only Memory (ROM), and flash memory. The storage unit 130 stores the data generated in the input terminal 100 and received from output external devices (e.g., server, desktop PC, and tablet PC) through the wireless communication unit 140 or the wired communication unit 160 under the control of the control unit 170.

The storage unit stores a booting program, at least one Operating System (OS), and applications (particularly, mouse host application 131). The OS is responsible for providing interfaces between hardware and applications and among the applications and manages the computer resources such as CPU, GPU, main memory 162, and storage unit 130. The applications are classified into embedded applications and third party applications. The embedded applications may include a web browser application, an email application, and an instant messenger application. The mouse host application 131 is a program capable of using the mobile terminal as a mouse. If the battery power is supplied to the control unit 170, the booting program is loaded on the main memory of the control unit 170. The booting program loads the OS in the main memory. The OS loads the applications in the memory.

The RF unit 140 is responsible for voice, video, and data communication with another terminal through a network under the control of the control unit 170. The RF unit 140 includes an RF transmitter for frequency up-converting and amplifying the signal to be transmitted, and an RF receiver for low noise amplifying and down converting the received signal. The RF unit 140 includes at least one of a cellular communication module (e.g., 3rd, 3.5th, and 4th Generation mobile communication modules), a digital broadcast module (e.g., DMB module), and a short range communication module (e.g., Wi-Fi module, Bluetooth module 141 and Near Field Communication (NFC) module). The short range communication module, particularly the Bluetooth module 141, sends the input information to the output terminal under the control of the control unit 170. Here, the input information includes the touch coordinates. The input information is also capable of including the function execution information (e.g., pointer movement, image movement, and zooming).

The audio processing unit 150 performs speech recognition, voice recording, and audio signal (e.g., voice) input and output for digital recording and call processing in cooperation with a speaker (SPK) and a microphone (MIC). The audio processing unit 150 converts the analog audio signal input through the microphone (MIC) to the digital audio signal and sends the digital audio signal to the control unit 170. The speaker (SPK) converts the audio signal from the audio processing unit 150 to an audible sound wave. The microphone (MIC) converts the sound wave of human voice or output from a sound source to the audio signal.

The wired communication unit 160 connects the input terminal 100 to an external device (e.g., output terminal) through a wire (e.g., USB cable). That is, the input unit 100 is capable of transmitting the input information to the output terminal instead of the wireless communication unit 140.

The control unit 170 controls overall operations of the input terminal 100, signal flows among the components of the input terminal 100, and power supply to the components, and processes data. The control unit 170 includes plural Central Processing Units (CPUs). The CPU is the main control unit of a computer system for performing operation and comparison on data and interpreting and executing commands. The CPU includes various registers storing data and commands temporarily.

The control unit 170 may include at least one Graphic Processing Unit (GPU). The GPU is the graphic control unit for performing operation and comparison on the graphic data and interpreting and executing commands related to the graphic data instead of the CPU. Each of the CPU and GPU can be manufactured as a package of two or more independent cores (e.g., quad-core). The CPU and GPU may be integrated in the form of System on Chip (SoC). The CPU and GPU also may be multilayer-packaged. The structure of the CPU and GPU can be referred to as an Application Processor (AP).

The control unit 170 includes the main memory unit, e.g., RAM. The application programs loaded from the storage unit 130 reside in the main memory. That is, the CPUs and GPUs access the programs to interpret a program command and execute the function according to the interpretation result. Particularly, the CPUs execute the functions of at least one mouse host application 131. The functions of the mouse host application 131 are described later in detail with reference to the accompanying drawings. The control unit 170 also includes a cache memory for storing data to be written to or read from the storage unit temporarily.

Although not enumerated herein, the input terminal according to an embodiment of the present disclosure is capable of including other components such as a GPS module, vibration motor, accessory, ear jack, and the like, which may be equivalent to the aforementioned components according to the tendency of digital device convergence. Here, an accessory means a detachable device such as stylus pen for making a touch input on the touchscreen. Also, the input terminal 100 can be implemented with or without at least one of the aforementioned functional components and their equivalent devices.

Figure 2:
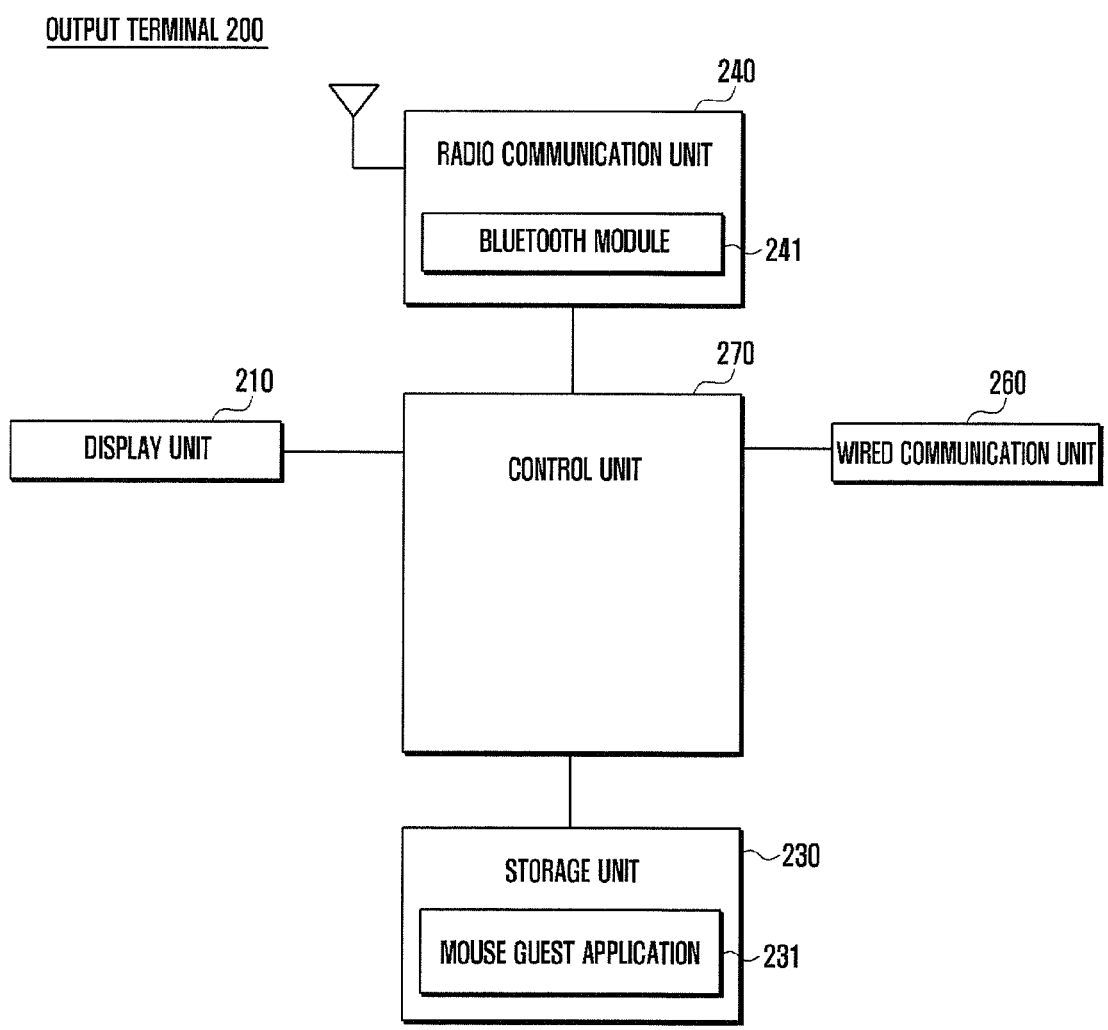
FIG. 2 is a block diagram illustrating a configuration of the output terminal according to an embodiment of the present disclosure.

FIG. 2 is a block diagram illustrating a configuration of the output terminal according to an embodiment of the present disclosure.

As shown in FIG. 2, the output terminal 200 according to an embodiment of the present disclosure includes a display unit 210, a key input unit 220, a storage unit 230, a radio communication unit 240, an audio processing unit 250, a speaker (SPK), a microphone (MIC), and a control unit 270.

The display unit 210 displays images (e.g., photo, webpage, electronic book page, thumbnail images, and song list) and a pointer under the control of the control unit 270. The display unit 210 displays the pointer on the top most layer under the control of the control unit 270. For example, a mouse guest application 231 is executed, and the point is presented on the screen. The display unit 210 can be implemented with one of a Liquid Crystal Display (LCD), Organic Light Emitted Diode (OLED), Active Matrix Organic Light Emitted Diode (AMOLED), and flexible display. In scenarios where the output terminal 200 is a projector, the display unit 210 includes an optical device for projecting the image received from the control unit 270 to a screen.

The storage unit 230 stores a booting program, at least one Operating System (OS), and applications (particularly, mouse guest application 231). The mouse guest application 231 is a program capable of allowing the user to use the mobile terminal as a mouse. The mouse guest application 231 is loaded on the main memory of the control unit 270 by the OS.

The radio communication unit 240 includes a short range communication module, particularly a Bluetooth module 241. The Bluetooth module 241 receives the information input by means of the input terminal 100 under the control of the control unit 270.

The wired communication unit 260 connects the output terminal 200 to an external device (e.g., input terminal 100) through a wire (e.g., USB cable). That is, the output terminal 200 is capable of receiving the input information from the input terminal 100 through the wired communication unit 260 other than the wireless communication unit 240. If the projector is connected to the wired communication unit 260, the control unit 270 can control the projector to display the image and pointer.

The control unit 270 accesses the main memory to interpret the command of a program, (e.g., mouse guest application 231) and executes the function according to the interpretation result. For example, the control unit 270 receives the touch coordinates (x_host, y_host) from the input terminal through the wireless communication unit 240 and controls the display unit 210 to present the pointer at the pointer coordinates (x_pointer, y_pointer). The functions of the mouse guest application 231 are described later in detail with reference to accompanying drawings.

The output terminal 200 may further include a key input unit, an audio processing unit, a speaker, a microphone, an ear jack, and the like.

Figure 3:
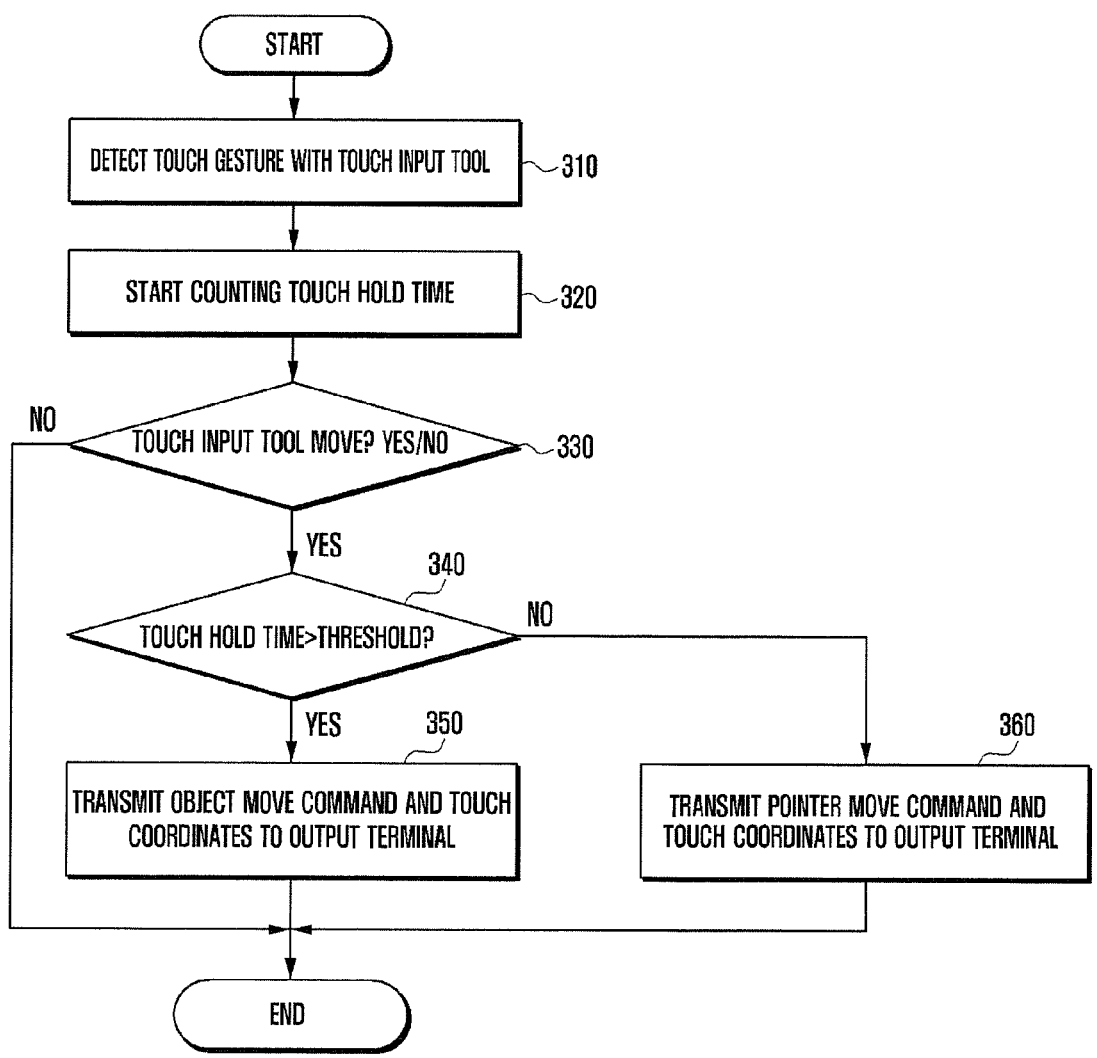
FIG. 3 is a flowchart illustrating the mouse function provision method according to an embodiment of the present disclosure.

FIG. 3 is a flowchart illustrating the mouse function provision method according to an embodiment of the present disclosure. FIGS. 4, 5A to 5C, 6A, 6B, 7, and 8A and 8B are diagrams illustrating example screen displays presented on the input and output terminals for explaining the mouse function provision method according to an embodiment of the present disclosure.

Referring to FIGS. 1 to 4, 5A to 5C, 6A, 6B, 7, and 8A and 8B, the control unit 170 of the input terminal 100 detects a request for executing the mouse host application 131 from the touch panel 111 or the key input unit 120 (e.g., a tap on the corresponding icon). In response to the execution request, the control unit 170 loads the mouse host application 131 on the main memory and executes the function of the mouse host application 131.

Figure 4:
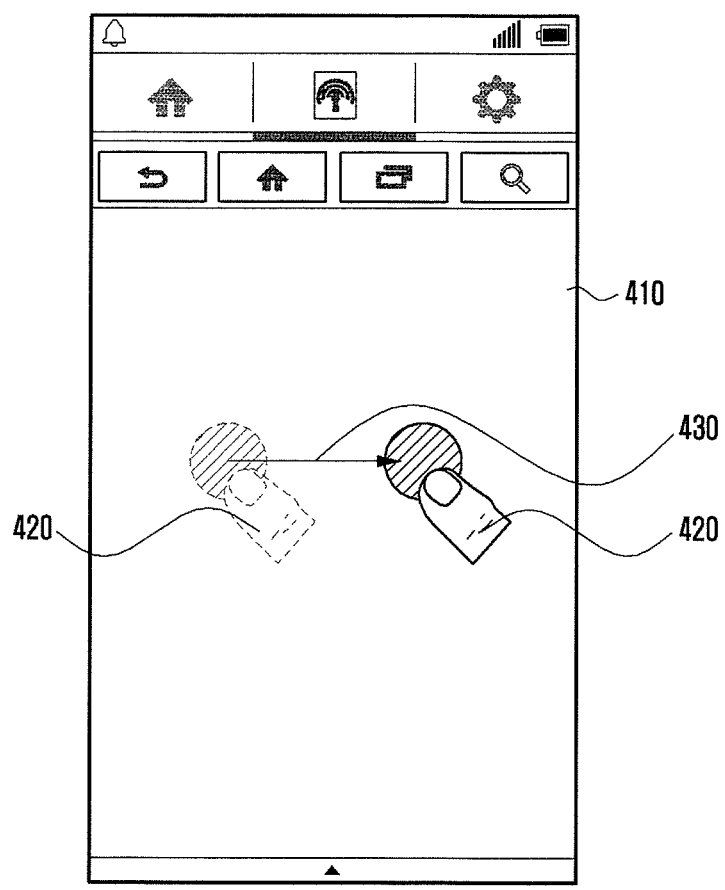
FIGS. 4, 5A to 5C, 6A, 6B, 7, 8A and 8B are diagrams illustrating example screen displays presented on the input and output terminals for explaining the mouse function provision method according to an embodiment of the present disclosure.
Figure 5A:
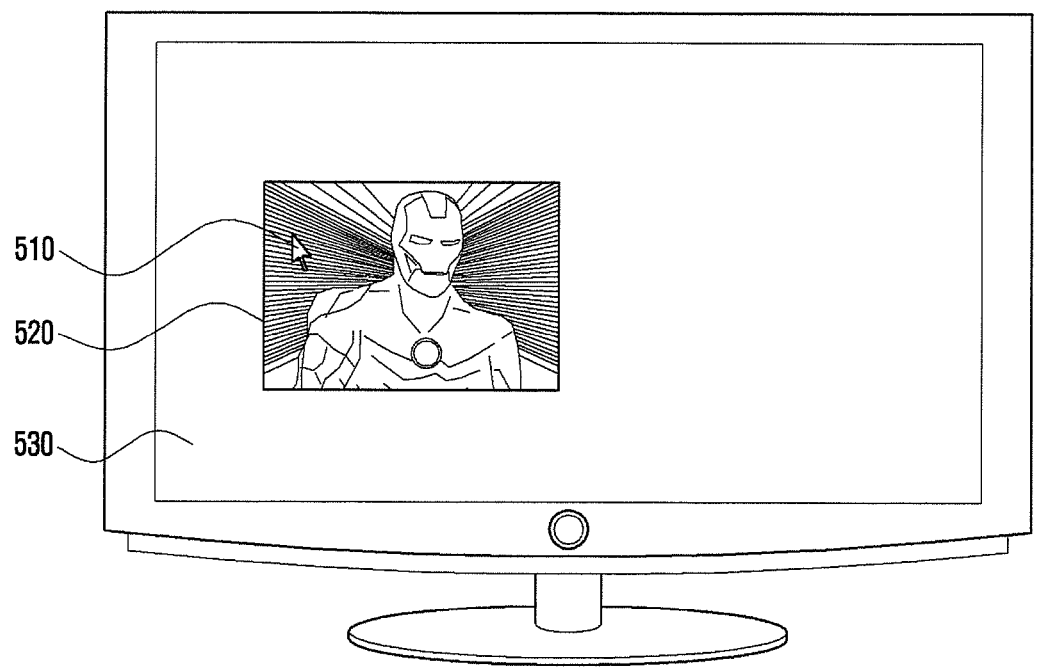
Figure 5B:
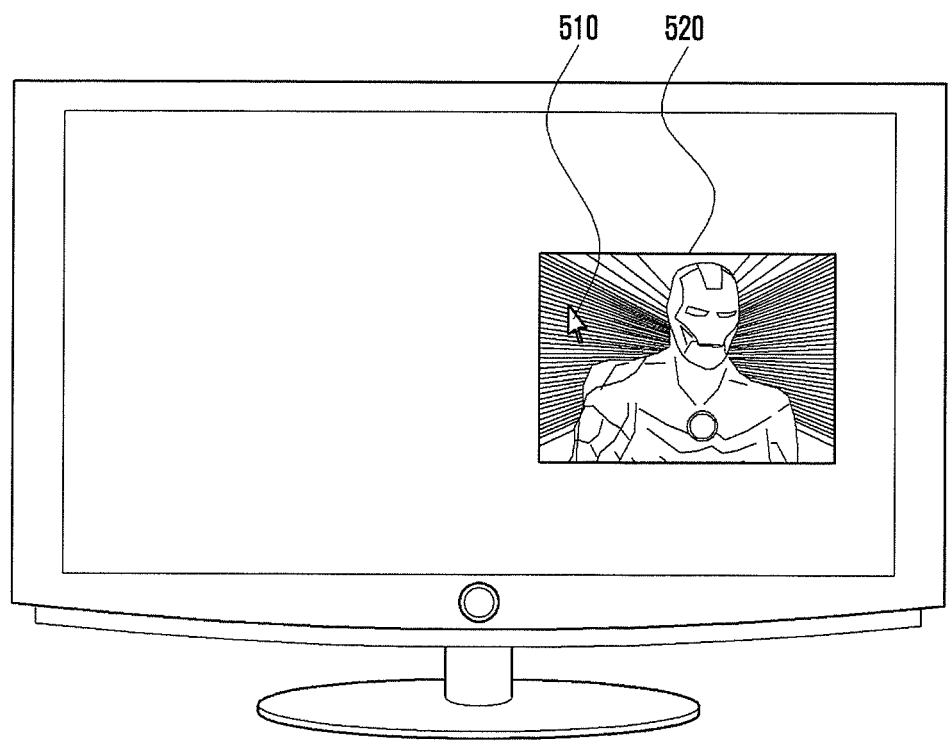

First, the control unit 170 controls the display unit 110 to display a mouse operation image 410 on the screen as shown in FIG. 4. The control unit 170 also controls the output terminal 200 remotely to display the pointer 510 as shown in FIG. 5A. For example, the Bluetooth module 141 transmits a mouse guest application execution command to the output terminal 200. The output terminal 200 receives the execution command from the input terminal 100 by means of the wireless communication unit 240. In response to the execution command from the input terminal 100, the control unit 270 executes the mouse guest application 231 and controls the display unit 210 to displays the pointer 510. At this time, the position of the pointer 510 may correspond to predetermined coordinates or coordinates determined randomly. The pointer 510 is presented on the top layer of the screen. In the embodiment shown in FIG. 5A, the background image 530 is displayed on the bottom layer, the photo 520 on the background image, and then the pointer 510 on the photo 520.

The control unit 170 detects a touch gesture made with the touch input tool 420 on the mouse operation image 410 at operation 310. For example, the control unit 170 receives touch coordinates (x_host_0, y_host_0) from the touch panel 111 at time t0 and recognizes the touch gesture 420 made on the mouse operation image 410. The control unit 170 controls the wireless communication unit 140 to transmit the touch coordinates (x_host_0, y_host_0) to the output terminal 200. The control unit 270 of the output terminal 200 receives the touch coordinates (x_host_0, y_host_0) from the wireless communication unit 240 and maps this to the pointer coordinates (x_pointer_0, y_pointer_0).

The control unit 170 counts the touch holding time in response to the touch 420 at operation 320. That is, the touch holding time count starts at time $t_0$.

The control unit 170 determines whether the touch input tool 420 moves at operation 330. For example, if the displacement between the touch coordinates (x_host_0, y_host_0) at time $t_0$ and the coordinates (x_host_n, y_host_n) at time $t_n$ that are transmitted by the touch panel 111 is greater than a predetermined movement threshold (e.g., 1 millimeter), the control unit 170 determines the presence of movement 430.

If it is determined that the touch input tool 420 has moved, the control unit 170 checks the counted touch holding time and determines whether the touch holding time is greater than a predetermined hold threshold (e.g., 1 second) at operation 340.

If the touch holding time is greater than the hold threshold, the control unit 170 controls the wireless communication unit 140 to transmit the object move command and the touch coordinates (x_host_n, y_host_n) to the output terminal 200 at operation 350. The wireless communication 240 of the output terminal 200 receives the object move command and the touch coordinates (x_host_n, y_host_n) and sends these to the control unit 270. Then the control unit 270 converts the touch coordinates (x_host_n, y_host_n) to the pointer coordinates (x_pointer_n, y_pointer_n) and calculates the direction and distance based on the pointer coordinates (x_pointer_n, y_pointer_n).

Next, the control unit 270 moves the image below the pointer based on at least one of the calculated direction and distance. In the embodiment shown in FIG. 5B, the control unit 270 moves the image 520 below the pointer 510 along with the pointer 510 as much as the calculated distance in the calculated direction. In the embodiments shown in FIGS. 4, 6A, and 6B, the first image 610 is replaced by the second image 620 in response to the movement 430, i.e., a panning gesture. Here, the first image 610 may be any of a webpage, home image, or electronic book page. The second image 620 may be another webpage, another home image, or another electronic book page. In the embodiments shown in FIGS. 7, 8A, and 8B, the items 4 to 8 (e.g., contact items) are presented. If a downward scroll 710 is generated in this state, the items 7 and 8 moves downward to disappear such that the items 1 to 5 are presented on the screen. If the user holds over 1 second (hold threshold) and moves the touch tool, this corresponds to the gesture in that the user moves the mouse in the state of pressing the left button of the mouse or rotates the wheel of the mouse.

Figure 5C:
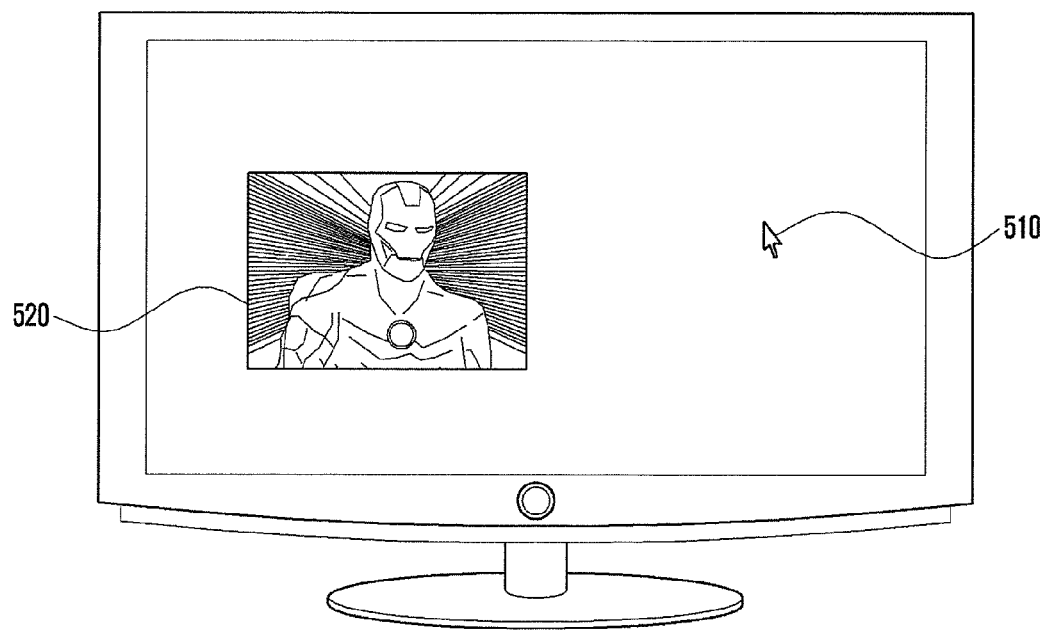
Figure 6A:
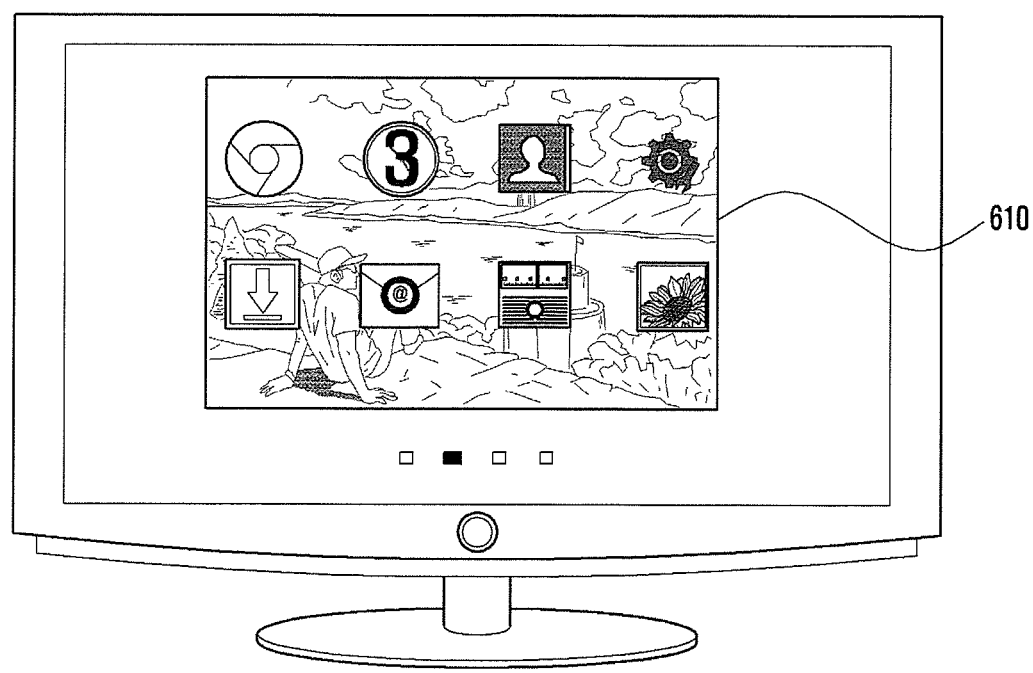
Figure 6B:
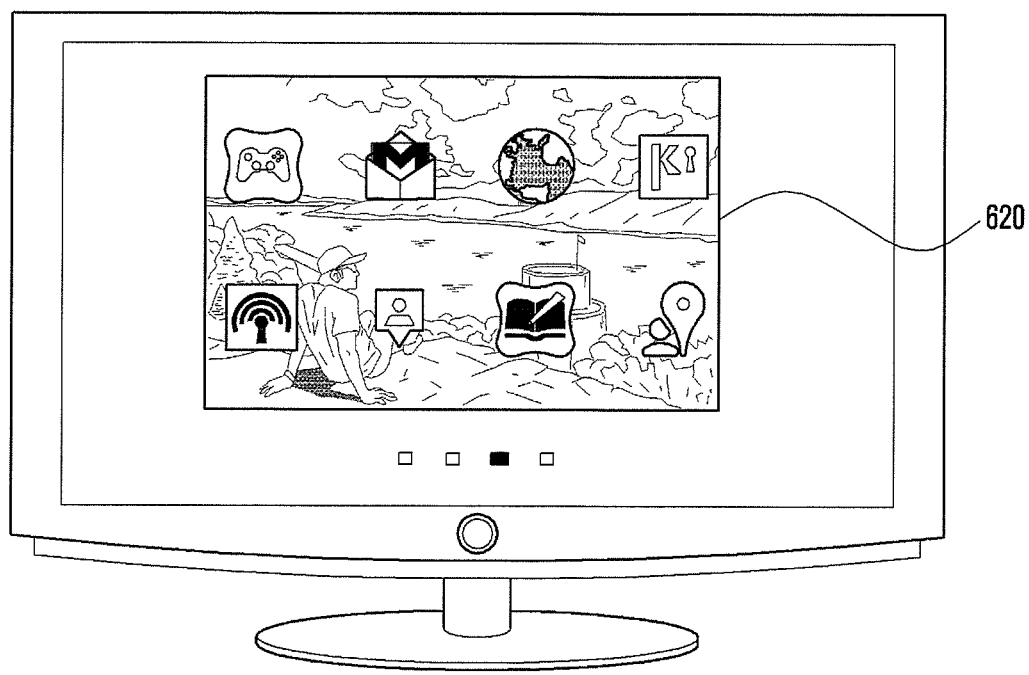
Figure 7:
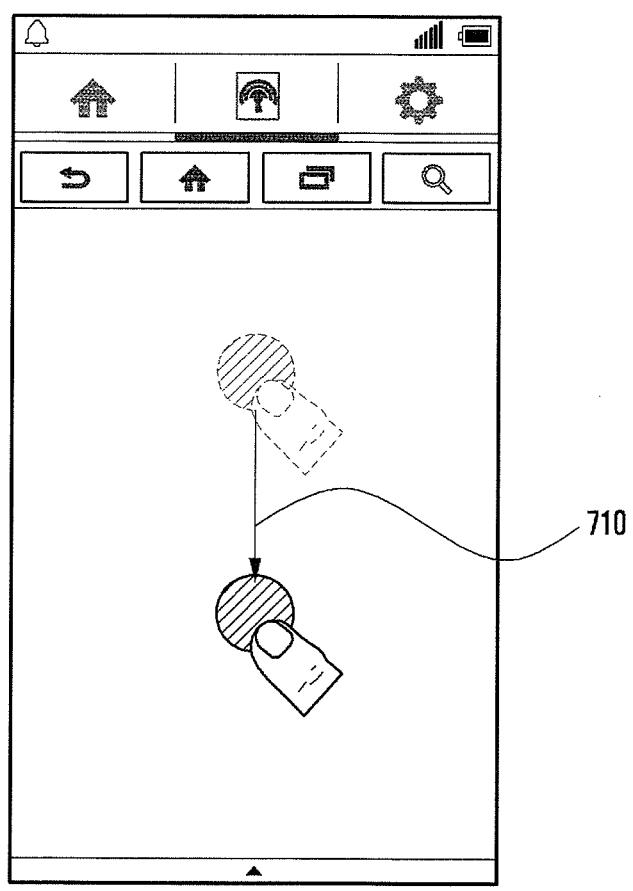
Figure 8A:
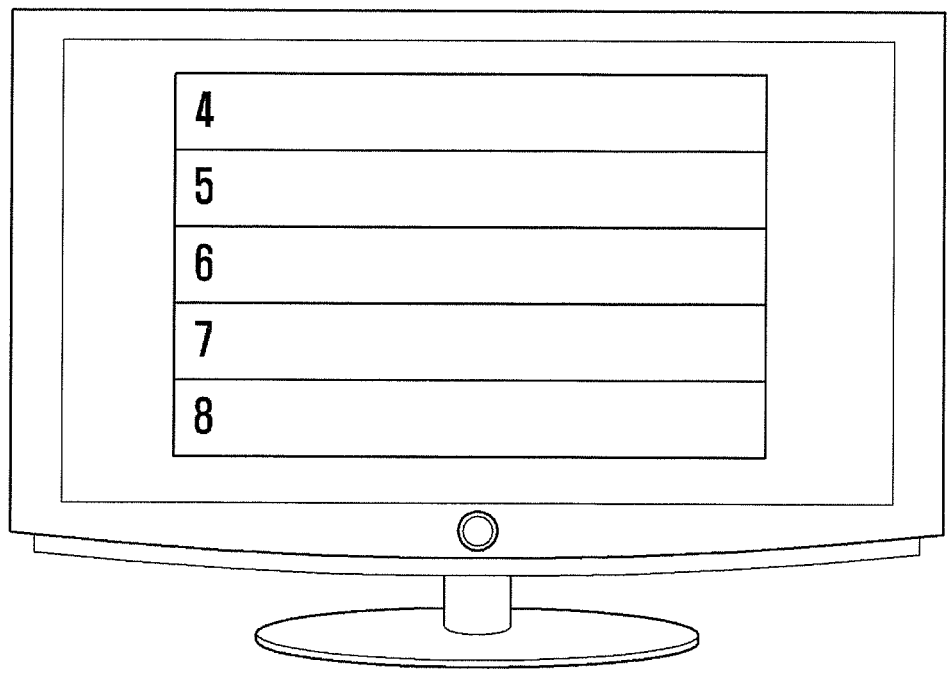
Figure 8B:
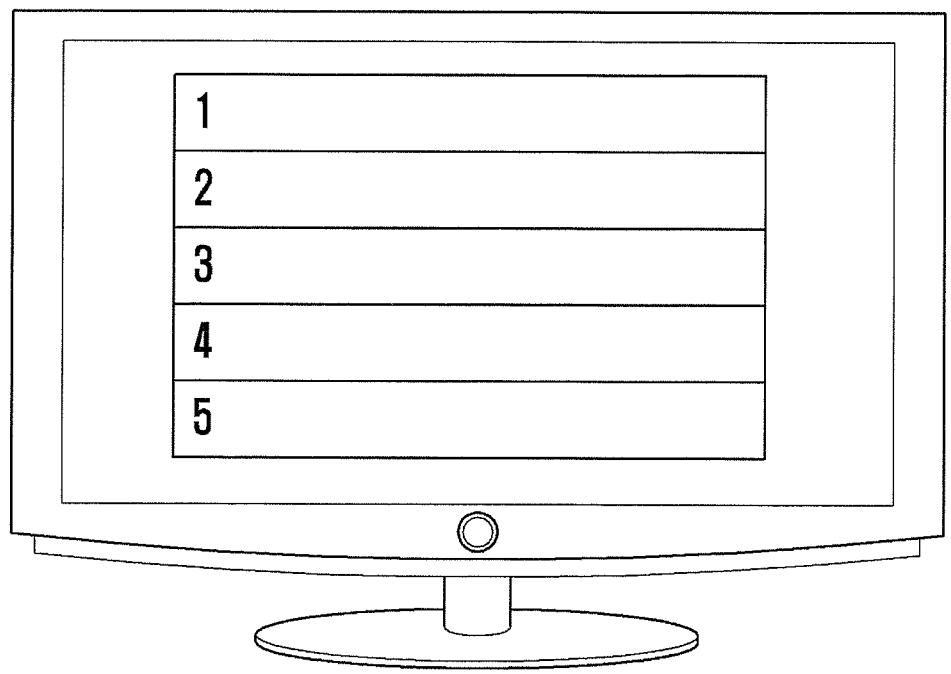

If the touch holding time is not greater than the hold threshold, the control unit 170 controls the wireless communication unit 140 to transmit the pointer move command and the touch coordinates (x_host_n, y_host_n) to the output terminal 200 at operation 360. The wireless communication unit 240 of the output terminal 200 receives the pointer move command and the touch coordinates (x_host_h, y_host_n) and sends these to the control unit 270. Then the control unit 270 converts the touch coordinates (x_host_n, y_host_n) to the pointer coordinates (x_pointer_n, y_pointer_n) and calculates the direction and distance based on the pointer coordinates (x_pointer_n, y_pointer_n). Next, the control unit 270 moves the pointer 510 as much as the calculated distance in the calculated direction as shown in FIG. 5C. If the user moves the touch tool in 1 second, this corresponds to the gesture of moving the mouse without pressing any button of the mouse.

Figure 9:
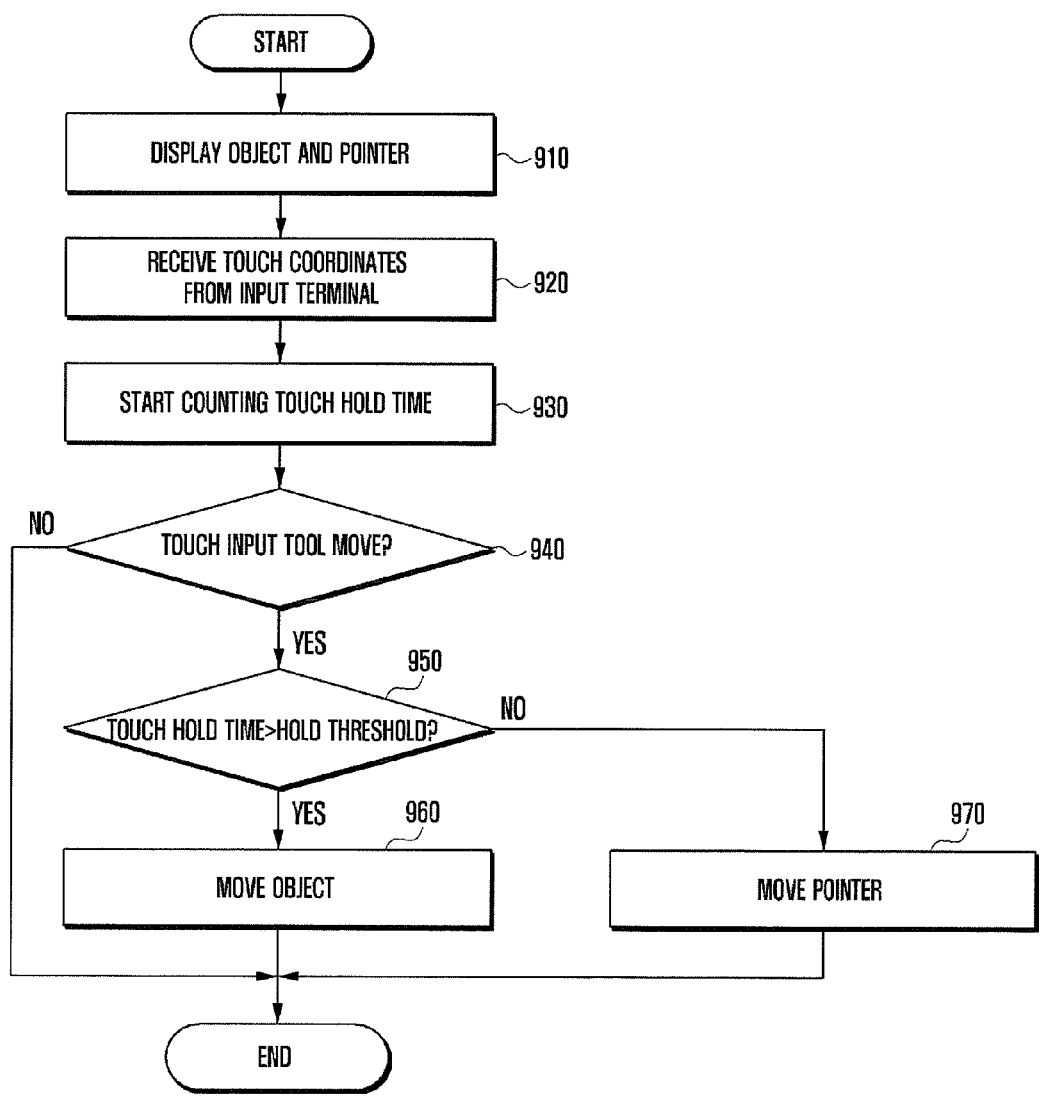
FIG. 9 is a flowchart illustrating a mouse function provision method according to another embodiment of the present disclosure.

FIG. 9 is a flowchart illustrating a mouse function provision method according to another embodiment of the present disclosure.

Referring to FIG. 9, the control unit 270 of the output terminal 200 displays an object and a pointer at operation 910. In detail, the display unit 210 displays an object (e.g., a photo, home image, or webpage) under the control of the control unit 270. The wireless communication unit 240 receives a mouse guest application execution command from the input terminal 100 and sends these to the control unit 270. The control unit 270 executes the mouse guest application 231 and controls the display unit 210 to display the pointer.

The control unit 270 receives the touch coordinates (x_host_0, y_host_0) from the input unit 100 by means of the wireless communication unit 240 at operation 920. The control unit 270 maps the touch coordinates (x_host_0, y_host_0) to the pointer coordinates (x_pointer_0, y_pointer_0).

The control unit 270 starts counting the touch holding time at operation 930. That is, the touch holding time is counted from the time $t_0$ when the touch coordinates (x_host_0, y_host_0) are received.

The control unit 270 determines whether the touch input tool moves at operation 940. If the displacement between the touch coordinates (x_host_0, y_host_0) at time $t_0$ and the coordinates (x_host_n, y_host_n) at time $t_n$ that are received from the input terminal 100 is greater than a predetermined movement threshold (e.g., 1 millimeter), the control unit 170 determines the presence of movement 430.

If it is determined that the touch input tool has moved, the control unit 170 checks the counted touch holding time and determines whether the touch holding time is greater than the hold threshold (e.g., 1 second) at operation 950.

If the touch holding time is greater than the hold threshold, the control unit 270 moves the object at operation 960. The object movement examples have been made with reference to operation 350. If the touch holding time is not greater than the hold threshold, the control unit 270 moves the pointer at operation 970.

Figure 10:
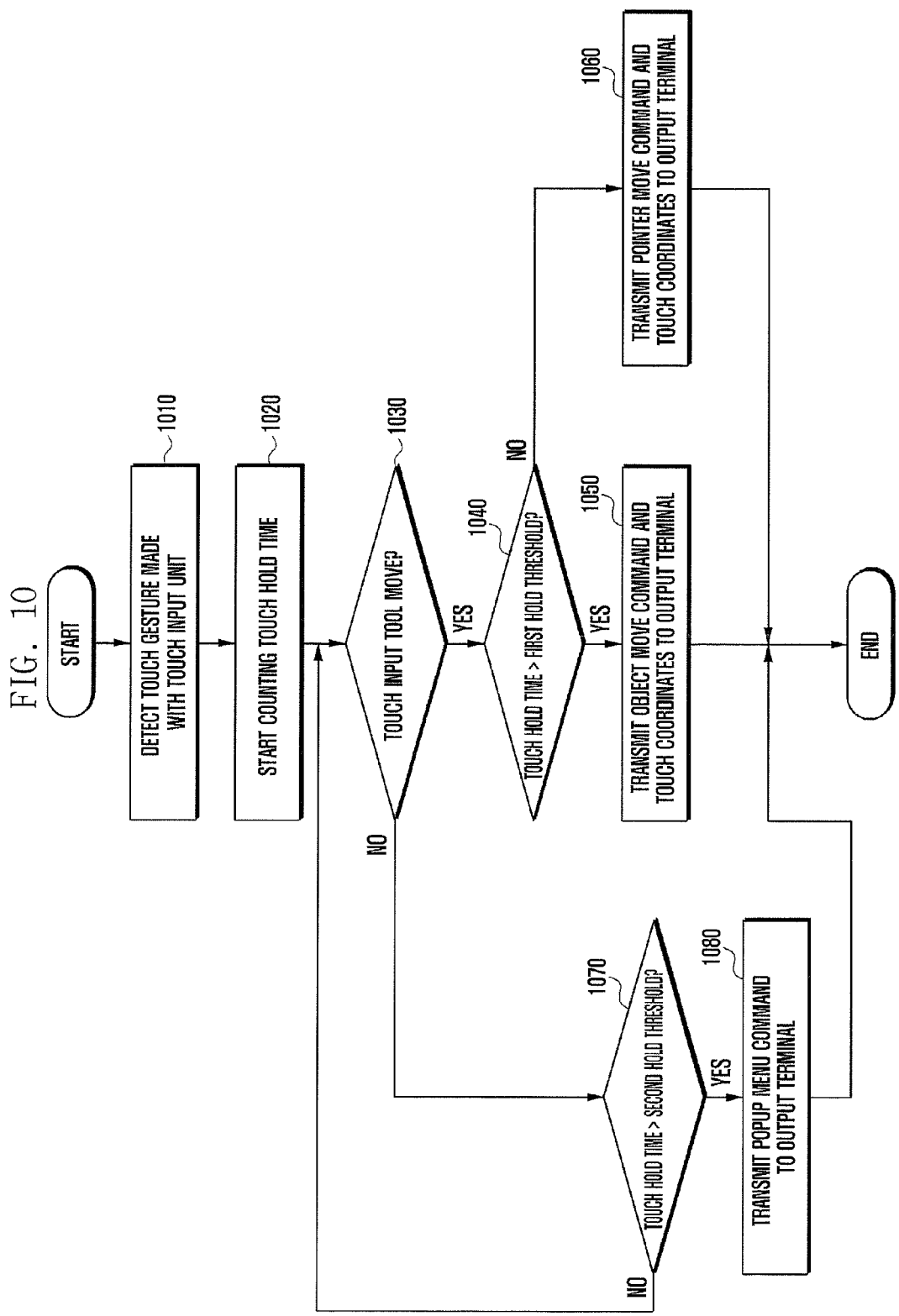
FIG. 10 is a flowchart illustrating a mouse function provision method according to another embodiment of the present disclosure.
Figure 11:
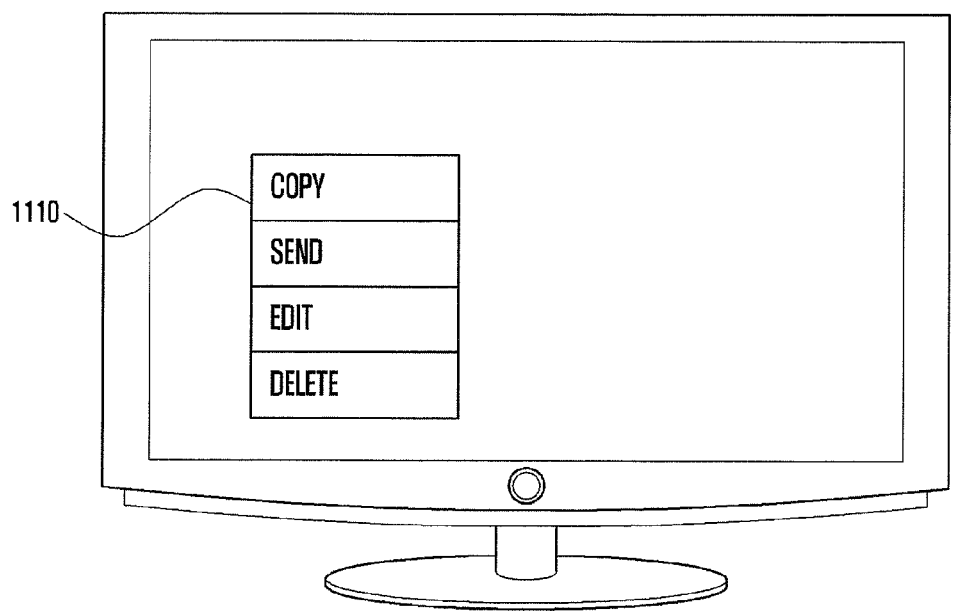
FIG. 11 is a diagram illustrating an example screen display presented on the screen of the output terminal for explaining the mouse function provision method according to another embodiment of the present disclosure.

FIG. 10 is a flowchart illustrating a mouse function provision method according to another embodiment of the present disclosure. FIG. 11 is a diagram illustrating an example screen display presented on the screen of the output terminal for explaining the mouse function provision method according to another embodiment of the present disclosure.

As described above with reference to FIG. 3, the mouse operation image is displayed on the screen of the input terminal 100 and the pointer is displayed on the screen of the output terminal 200.

Referring to FIGS. 10 and 11, the control unit 170 of the input terminal 100 detects a touch gesture on the mouse operation image at operation 1010.

The control unit 170 starts counting the touch holding time upon detection of the touch gesture at operation 1020. That is, the control unit 170 starts counting the touch holding time at the time $t_0$ when the touch coordinates (x_host_0, y_host_0) are received from the touch panel 111.

The control unit 170 determines whether the touch input tool moves at operation 1030. An example movement determination operation has been described with reference to operation 330.

If it is determined that the touch input tool moves, the control unit 170 checks the counted touch holding time and determines whether the touch holding time is greater than a first hold threshold (e.g., 1 second) at operation 1040.

If the touch holding time is greater than the first hold threshold, the control unit 170 controls the wireless communication unit 140 to transmit the object move command and the touch coordinates (x_host_n, y_host_n) to the output terminal at operation 1050.

If the touch holding time is not greater than the first hold threshold, the control unit 170 controls the wireless communication unit 140 to transmit the pointer move command and the touch coordinates (x_host_n, y_host_n) to the output terminal at operation 1060.

Otherwise, if no touch movement is detected at operation 1030, the control unit 170 determines whether the touch holding time is greater than a second hold threshold (e.g., 2 seconds) at operation 1070.

If the touch holding time is greater than the second hold threshold, the control unit 170 controls the radio communication unit 140 to transmit a popup menu display command to the output terminal 200 at operation 1080. The wireless communication unit 240 of the output terminal 200 receives the popup menu display command and sends this to the control unit 270. Then the control unit 270 controls the display unit 210 to display the popup menu 1110 as shown in FIG. 11. If the user holds the touch over the second threshold value, this corresponds to pressing the right button of the mouse.

Figure 12:
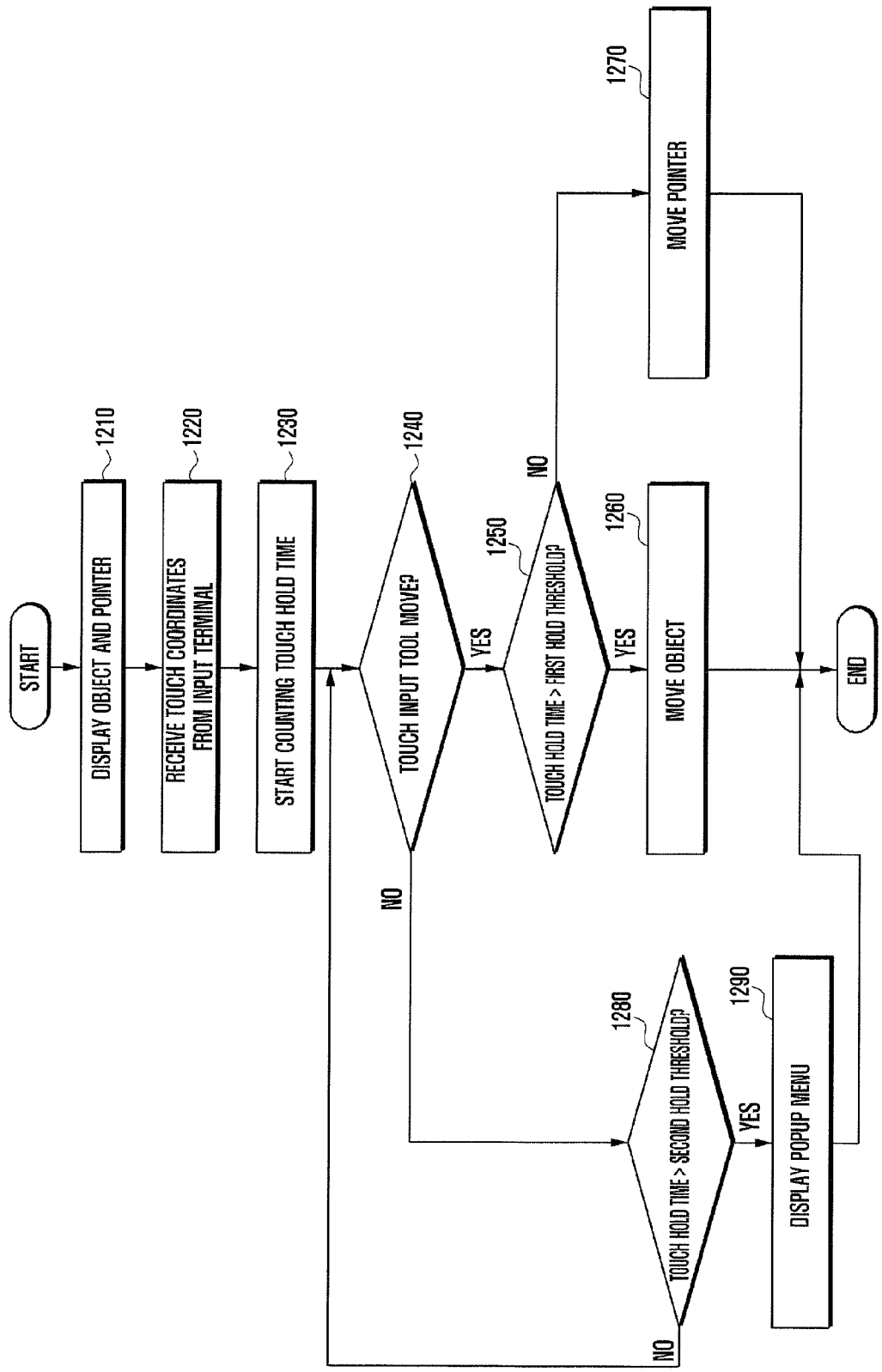
FIG. 12 is a flowchart illustrating the mouse function provision method according to another embodiment of the present disclosure.

FIG. 12 is a flowchart illustrating the mouse function provision method according to another embodiment of the present disclosure.

Referring to FIG. 12, the control unit 270 of the output terminal 200 displays the object and the pointer at operation 1210. An example operation of displaying the object and pointer has been described with reference to FIG. 9.

The control unit receives the touch coordinates (x_host_0, y_host_0) from the input terminal 100 by means of the wireless communication unit 240 and maps the touch coordinates (x_host_0, y_host_0) to the pointer coordinates (x_pointer_0, y_pointer_0) at operation 1220.

The control unit 270 starts counting the touch holding time at operation 1230. That is, the touch holding time is counted from the time $t_0$ when the touch coordinates (x_host_0, y_host_0) are received.

The control unit 270 determines whether the touch input tool moves at operation 1240. An example movement determination operation has been described with reference to operation 940.

If the touch movement is detected, the control unit 170 checks the counted touch holding time and determines whether the touch holding time is greater than a first hold threshold (e.g., 1 second) at operation 1250.

If the touch holding time is greater than the first hold threshold, the control unit 270 moves the object at operation 1260. An example image movement operation has been described with reference to operation 350. If the touch holding time is not greater than the first hold threshold, the control unit 270 moves the pointer at operation 1270.

If no touch movement is detected at operation 1240, the control unit 270 determines whether the touch holding time is greater than the second threshold (e.g., 2 seconds) at operation 1280.

If the touch holding time is greater than the second hold threshold, the control unit 270 controls the display unit 210 to display the popup menu 1110 as shown in FIG. 11 at operation 1290.

FIGS. 13, 14A, 14B, 15, 16A, and 16B are diagrams illustrating example screen displays presented on the input and output terminals for explaining the mouse function provision method according to another embodiment of the present disclosure.

Figure 13:
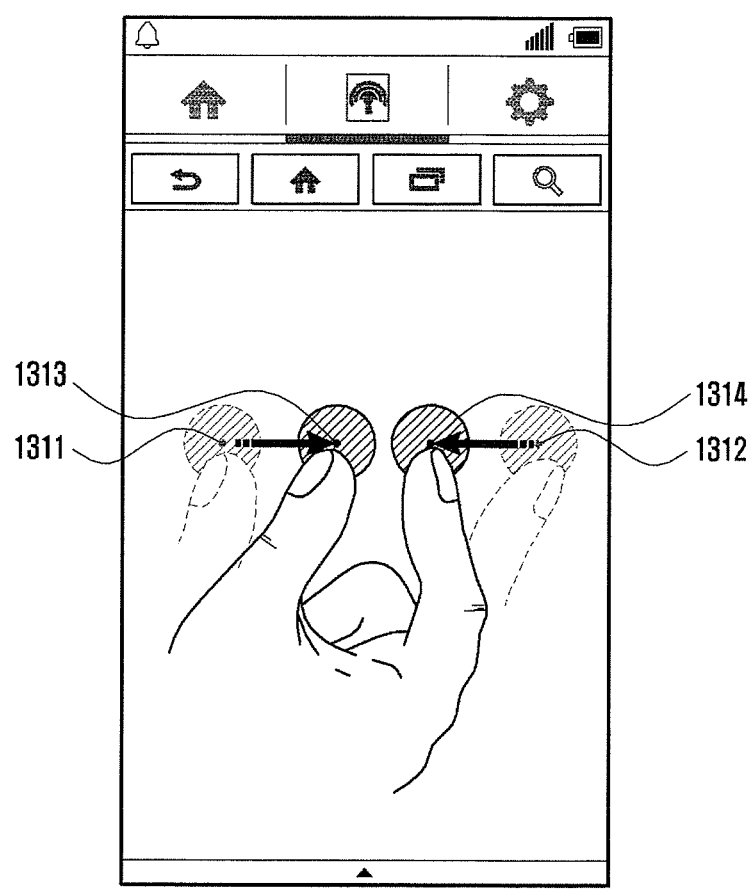
FIGS. 13, 14A, 14B, 15, 16A, and 16B are diagrams illustrating example screen displays presented on the input and output terminals for explaining the mouse function provision method according to another embodiment of the present disclosure.
Figure 14A:
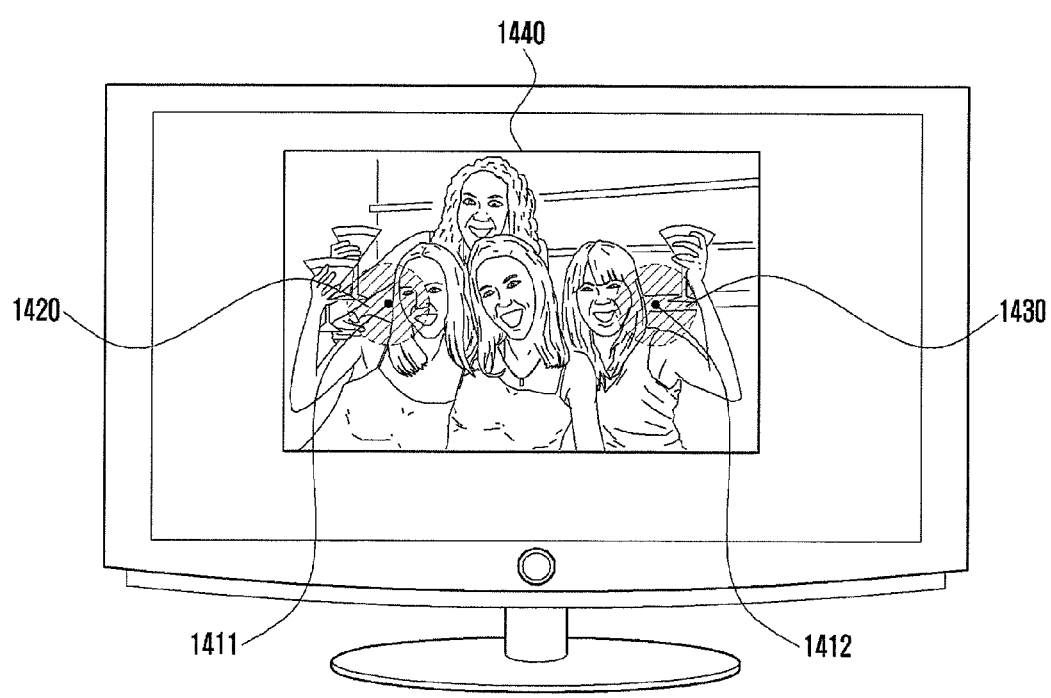
Figure 14B:
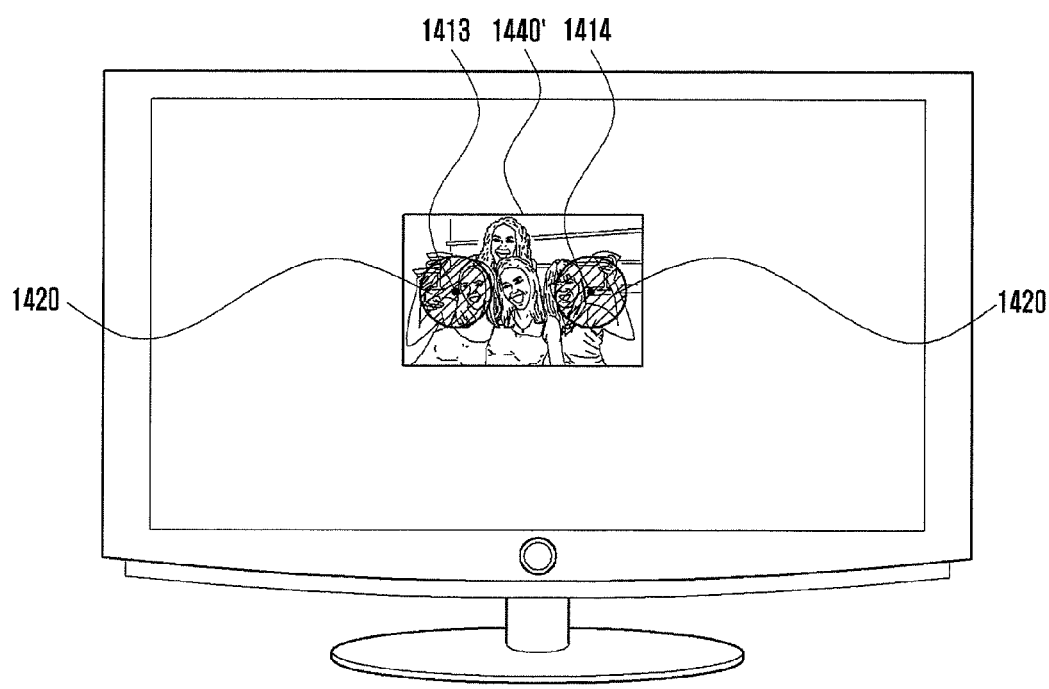
Figure 15:
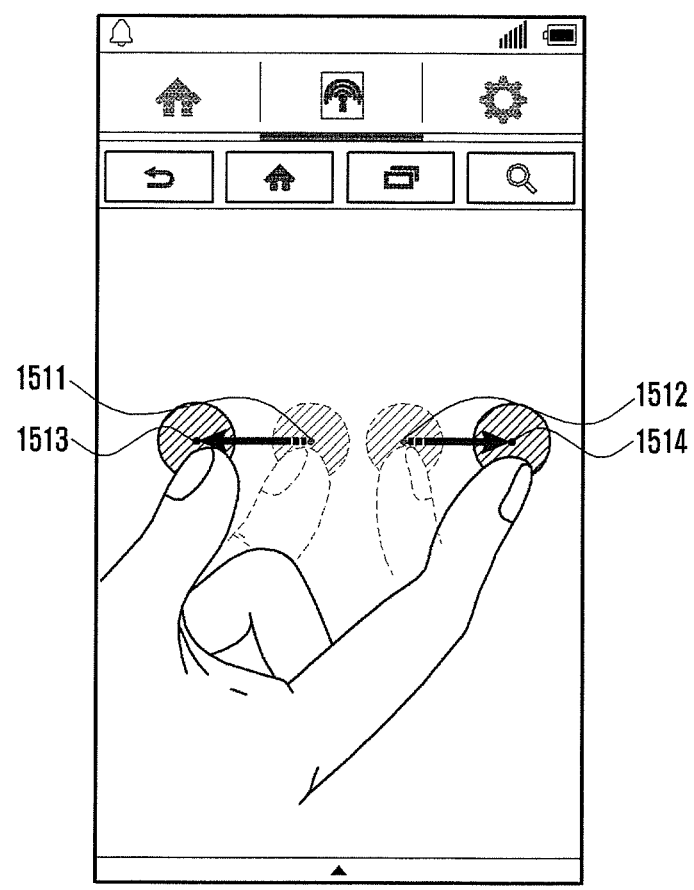

A description is made of a zoom-out operation according to an embodiment of the present disclosure with reference to FIGS. 13, 14A, and 14B. The control unit 170 detects a multi-touch gesture on the touch panel 111. For example, the control unit 170 receives the first touch coordinates 1311 and the second touch coordinates 1312 from the touch panel 111 simultaneously at time $t_0$. Then the control unit determines that a multi-touch gesture has been made and controls the wireless communication unit 140 to transmit the first and second touch coordinates 1311 and 1312 to the output terminal 200. The control unit 270 of the output terminal 200 receives the first and second touch coordinates 1311 and 1312 from the input terminal 100, converts the first and second touch coordinates 1311 and 1312 to the first and second pointer coordinates 1411 and 1412, and calculates the distance D1 between the first and second pointer coordinates 1411 and 1412. As shown in FIG. 14A, the control unit 270 controls the display unit 210 to present the first and second pointer 1420 and 1430 at the first and second pointer coordinates 1411 and 1412 respectively.

Afterward, the control unit 170 receives the third and fourth touch coordinates 1313 and 1314 at time $t_n$ from the touch panel 111 and controls the radio communication unit 140 to transmit the third and fourth touch coordinates 1313 and 1314 to the output terminal 200. Then the control unit 270 of the output terminal 200 converts the third and fourth touch coordinates 1313 and 1314 to the third and fourth pointer coordinates 1413 and 1414. The control unit 270 controls the display unit 210 to display the first and second pointer 1420 and 1430 at the third and fourth pointer coordinates 1413 and 1414 as shown in FIG. 14B. The control unit 270 also calculates the distance D2 between the third and fourth pointers 1413 and 1414, determines whether D2 is less than D1 (D2<D1), zooms out the image 1440 when D2<D1, and controls the display unit 210 to display the zoomed-out image 1440' as shown in FIG. 14B.

A description is made of a zoom-out operation according to another embodiment of the present disclosure. The control unit 170 detects a pinch-in gesture on the touch panel 111. In detail, the control unit 170 receives first and second touch coordinates from the touch panel 111 at the time $t_0$. Then the control unit 170 determines that a multi-touch gesture has been made and calculates the distance D1 between the first and second touch coordinates. Afterward, the control unit receives third and fourth touch coordinates from the touch panel 111 at time $t_n$ and calculates the distance D2 between the third and fourth touch coordinates. If D2<D1, the control unit 170 controls the wireless communication unit 140 to transmit a zoom-out command to the output terminal 200. The control unit 270 of the output terminal 200 selects one of the displayed images (e.g., an image on the topmost layer), zooms out the image, and controls the display unit to display the zoomed-out image.

A description is made of a zoom-in operation according to an embodiment of the present disclosure. The control unit 170 detects a multi-touch gesture on the touch panel 111. For example, the control unit 170 receives first and second touch coordinates 1511 and 1512 from the touch panel 111 simultaneously at the time $t_0$. Then the control unit 170 determines that the multi-touch has been made and controls the wireless communication unit 140 to transmit the first and second touch coordinates 1511 and 1512 to the output terminal 200. The control unit 270 of the output terminal 200 receives the first and second touch coordinates 1511 and 1512 from the input terminal 100 by means of the wireless communication unit 240, converts the first and second touch coordinates 1511 and 1512 to first and second pointer coordinates 1611 and 1612, and calculates the distance D1 between the first and second pointer coordinates 1611 and 1612. The control unit 270 controls the display unit 210 to display the first and second pointers 1620 and 1630 at the first and second pointer coordinates 1611 and 1612.

Figure 16A:
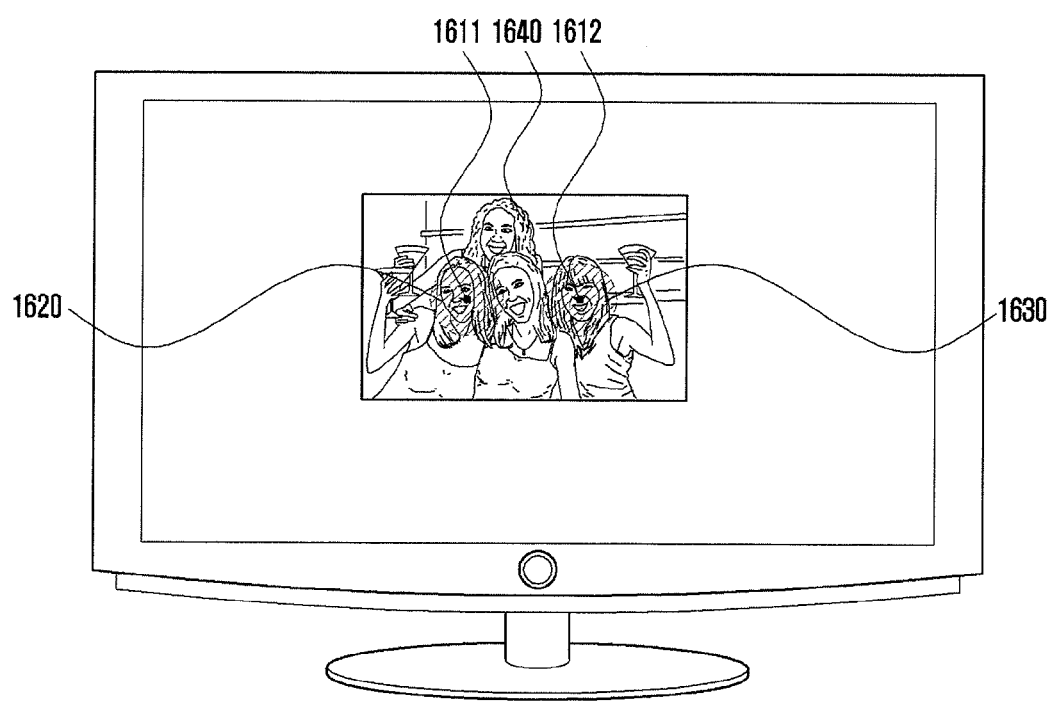
Figure 16B:
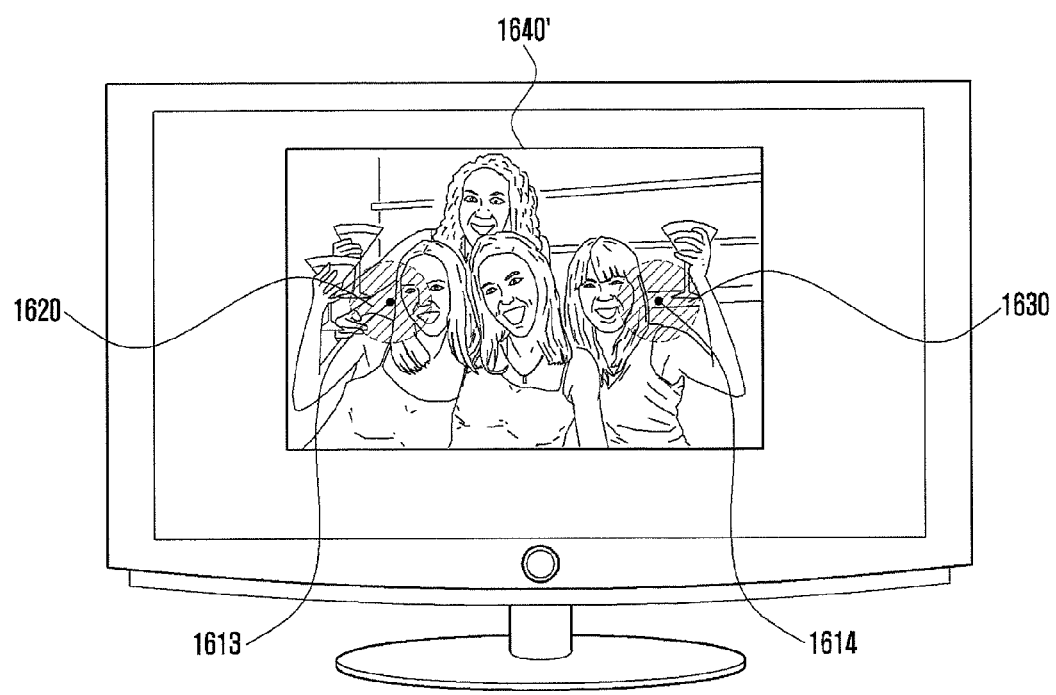

Afterward, the control unit receives third and fourth touch coordinates 1513 and 1514 from the touch panel 111 at time $t_0$ simultaneously and controls the wireless communication unit 140 to transmit the third and fourth touch coordinates 1513 and 1514 to the output terminal 200. Then the control unit 270 of the output terminal 200 converts the third and fourth touch coordinates 1513 and 1514 to third and fourth pointer coordinates 1613 and 1614. The control unit 270 controls the display unit 210 to display the first and second pointers 1620 and 1630 at the third and fourth pointer coordinates 1613 and 1614. The control unit 270 calculates the distance D2 between the third and fourth pointer coordinates 1613 and 1614, determines whether D2>D1, and, if so, zooms in the image 1640, and controls the display unit 210 to display the zoomed-in image 1640' as shown in FIG. 16B.

A description is made of a zoom-in operation according to another embodiment of the present disclosure. The control unit 170 detects a pinch-out gesture on the touch panel 111. In detail, the control unit 170 receives first and second touch coordinates from the touch panel 111 simultaneously at the time $t_0$. Then the control unit 170 determines that a multi-touch gesture has been made and calculates the distance D1 between the first and second touch coordinates. Afterward, the control unit 170 receives third and fourth coordinates from the touch panel 111 simultaneously at the time $t_n$ and calculates the distance D2 between the third and fourth touch coordinates. If D2>D1, the control unit 170 controls the wireless communication unit 140 to transmit a zoom-in command to the output terminal 200. The control unit 270 of the output terminal 200 selects one of the displayed images (e.g., an image on the topmost layer), zooms in the image, and controls the display unit 210 to display the zoomed-in image.

The above-described mouse function provision method according to an embodiment of the present disclosure can be implemented in the form of computer-executable program commands and stored in a computer-readable storage medium. The computer readable storage medium may store the program commands, data files, and data structures in individual or combined forms. The program commands recorded in the storage medium may be designed and implemented for various embodiments of the present disclosure or used by those skilled in the computer software field. The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various embodiments of the present disclosure.

The mouse function provision method and mobile terminal for implementing the same can be practiced with various modifications without departing from the spirit of the present disclosure.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A mouse function provision method of a terminal having a display equipped with a touch panel, the method comprising:
   displaying a mouse operation image on a screen of the display in response to a mouse host application execution request;
   detecting a touch gesture made with a touch input tool on the mouse operation image;
   determining, when movement of the touch input tool is detected, whether a touch hold time counted from the detection of the touch gesture is greater than a first hold threshold or a second hold threshold; and
   transmitting, when the touch hold time is greater than the first hold threshold, an object move command to an output terminal according to the movement of the touch input tool, when the touch hold time is not greater than the first hold threshold, a pointer move command according to the movement of the touch input tool, and, when the touch hold time is greater than the second hold threshold, a popup menu display command,
   wherein the second hold threshold is greater than the first hold threshold,
   wherein the touch hold time is counted until the detection of the movement of the touch input tool, and
   wherein a popup menu includes a plurality of items corresponding to a plurality of functions, respectively.

2. The method of claim 1, further comprising transmitting a mouse guest application execution command in response to the mouse host application execution request.

3. The method of claim 1, further comprising:
   receiving a first touch coordinate and a second touch coordinate from the touch panel simultaneously;
   calculating a first distance between the first touch coordinate and the second touch coordinate;
   receiving a third touch coordinate and a fourth touch coordinate from the touch panel simultaneously;
   calculating a second distance between the third touch coordinate and the fourth touch coordinate; and
   determining whether the second distance is less than the first distance.

4. The method of claim 3, further comprising:
   transmitting zoom-in command to the output terminal when the second distance is less than the first distance; and
   transmitting zoom-out command to the output terminal when the second distance is equal to or greater than the first distance.

5. A mouse function provision method of a terminal, the method comprising:
   displaying an object and a pointer on the object;
   receiving first touch coordinate and second touch coordinate from a mobile terminal having a touch panel at an interval;

determining whether a touch input tool has moved, based on displacement between the first and second touch coordinate;

determining, when movement of the touch input tool is detected, whether a touch hold time counted from a time when the first touch coordinate have been received is greater than a first hold threshold;

displaying, when the touch hold time is greater than the first hold threshold, the object and pointer moved at a position corresponding to the second touch coordinate and, when the touch hold time is not greater than the first hold threshold, the pointer moved at a position corresponding to the second touch coordinate, wherein the touch hold time is counted until the detection of the movement of the touch input tool;

determining whether the touch hold time is greater than a second hold threshold; and displaying a popup menu when the touch hold time is greater than the second hold threshold, wherein the second hold threshold is greater than the first hold threshold, and wherein the popup menu includes a plurality of items corresponding to a plurality of functions, respectively.

6. The method of claim 5, wherein displaying the pointer comprises:

receiving a mouse guest application execution command from the mobile terminal; and displaying the pointer in response to the mouse guest application execution command.

7. The method of claim 5, further comprising:

receiving a first touch coordinate and a second touch coordinate from the mobile terminal simultaneously;

calculating a first distance between the first touch coordinate and the second touch coordinate;

receiving a third touch coordinate and a fourth touch coordinate from the mobile terminal simultaneously;

calculating a second distance between the third touch coordinate and the fourth touch coordinate; and determining whether the second distance is less than the first distance.

8. The method of claim 7, further comprising:

displaying zoom-in the object when the second distance is less than the first distance; and displaying zoom-out the object when the second distance is equal to or greater than the first distance.

9. A mobile terminal comprising:

a display having a touch panel;

a communication interface configured to communicate with an output terminal displaying an object and a pointer; and a controller operably connected to the display and the communication interface, the controller configured to:

display a mouse operation image on a screen of the display in response to a mouse host application execution request;

detect a touch gesture made with a touch input tool on the mouse operation image;

determine, when movement of the touch input tool is detected, whether a touch hold time counted from the detection of the touch gesture is greater than a first hold threshold;

transmit, when the touch hold time is greater than the first hold threshold, an object move command to an output terminal according to the movement of the touch input tool and, when the touch hold time is not greater than the first hold threshold, a pointer move command according to the movement of the touch input tool, wherein the touch hold time is counted until the detection of the movement of the touch input tool;

determine whether the touch hold time is greater than a second hold threshold; and transmit, when the touch hold time is greater than the second hold threshold, a popup menu display command to the output terminal, the second hold threshold being greater than the first hold threshold, and wherein a popup menu includes a plurality of items corresponding to a plurality of functions, respectively.

10. The mobile terminal of claim 9, wherein the controller is further configured to transmit a mouse guest application execution command in response to the mouse host application execution request.

11. The mobile terminal of claim 9, wherein the communication interface comprises a Bluetooth module configured to communicate with the output terminal.

12. The mobile terminal of claim 9, wherein the output terminal is one of a projector, a Television (TV), a multimedia device, an electronic appliance, and a computer equipped with a display.

13. A terminal comprising:

a display configured to display an object and a pointer on the object;

a communication interface configured to receive first touch coordinate and second touch coordinate from a mobile terminal at an interval; and a controller operably connected to the display and the communication interface, the controller configured to control to:

display an object and a pointer on the object;

receive first touch coordinate and second touch coordinate from a mobile terminal having a touch panel at an interval;

determine whether a touch input tool has moved, based on displacement between the first and second touch coordinate;

determine, when movement of the touch input tool is detected, whether a touch hold time counted from a time when the first touch coordinate have been received is greater than a first hold threshold;

display, when the touch hold time is greater than the first hold threshold, the object and the pointer moved at a position corresponding to the second touch coordinate and, when the touch hold time is not greater than the first hold threshold, the pointer moved at a position corresponding to the second touch coordinate, wherein the touch hold time is counted until the detection of the movement of the touch input tool;

determine whether the touch hold time is greater than a second hold threshold; and display, when the touch hold time is greater than the second hold threshold, a popup menu, the second hold threshold being greater than a first threshold value, and wherein the popup menu includes a plurality of items corresponding to a plurality of functions, respectively.

14. The terminal of claim 13, wherein the controller is further configured to receive a mouse guest application execution command from the mobile terminal and display the pointer in response to the mouse guest application execution command.

15. The terminal of claim 13, wherein the communication interface comprises a Bluetooth module configured to communicate with the mobile terminal.

16. The terminal of claim 13, wherein the terminal is one of a projector, a Television (TV), a multimedia device, an electronic appliance, and a computer equipped with a display.

\* \* \* \* \*